(12) United States Patent
Kwon et al.

(10) Patent No.: US 10,043,596 B2
(45) Date of Patent: Aug. 7, 2018

(54) WATER-AIR COMBINED PASSIVE FEED WATER COOLING APPARATUS AND SYSTEM

(71) Applicant: KOREA ATOMIC ENERGY RESEARCH INSTITUTE, Daejeon (KR)

(72) Inventors: Tae-Soon Kwon, Daejeon (KR); Kihwan Kim, Daejeon (KR); Hyun Sik Park, Daejeon (KR); Sung Won Bae, Daejeon (KR); Yusun Park, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 1013 days.

(21) Appl. No.: 14/287,551

(22) Filed: May 27, 2014

(65) Prior Publication Data
US 2015/0243383 A1 Aug. 27, 2015

(30) Foreign Application Priority Data
Feb. 27, 2014 (KR) .................. 10-2014-0023605

(51) Int. Cl.
*G21C 15/18* (2006.01)
*G21D 3/06* (2006.01)

(52) U.S. Cl.
CPC .............. *G21C 15/18* (2013.01); *G21D 3/06* (2013.01); *G21C 2015/185* (2013.01); *Y02E 30/40* (2013.01)

(58) Field of Classification Search
CPC .......... G21C 9/00; G21C 9/004; G21C 9/012; G21C 13/02; G21C 13/022; G21C 15/18;
(Continued)

(56) References Cited

U.S. PATENT DOCUMENTS

| 4,513,813 A | * | 4/1985 | Zanobini | .................. F28B 1/06 165/110 |
| 2007/0028626 A1 | | 2/2007 | Chen | |

(Continued)

FOREIGN PATENT DOCUMENTS

| JP | H 06242279 | 9/1994 |
| JP | 2013-076578 | 4/2013 |

(Continued)

OTHER PUBLICATIONS

Hudson Products Corporation, "The Basics of Axial Flow Fans" published 2000.*

*Primary Examiner* — Sharon M Davis
(74) *Attorney, Agent, or Firm* — Sheridan Ross P.C.

(57) ABSTRACT

Disclosed herein is a water-air combined passive feed water cooling apparatus including a water cooling heat exchanger connected to the inside of a containment building to cool down heat of a steam generator using a water cooling method, a cooling tank including the water cooling heat exchanger therein and storing cooling water condensing main steam generated by the steam generator, an evaporative steam pipe connected to the cooling tank, the evaporative steam pipe, into which steam of the cooling water generated by the water cooling heat exchanger in the cooling tank flows, an air cooling heat exchanger connected to the evaporative steam pipe and cooling down and liquefying the steam flowing into the evaporative steam pipe, and a condensed water collecting pipe for refilling the cooling tank with the steam liquefied by the air cooling heat exchanger.

20 Claims, 10 Drawing Sheets

(58) Field of Classification Search
CPC .... G21C 15/182; G21C 15/253; G21C 15/26; G21C 19/07; F28B 1/06; F28B 9/10; F25B 39/04; F21D 1/05341
USPC .......................................................... 165/176
See application file for complete search history.

(56) References Cited

U.S. PATENT DOCUMENTS

2012/0213322 A1    8/2012  Naito et al.
2013/0028365 A1*   1/2013  Tatli ....................... G21C 19/08
                                                        376/272

FOREIGN PATENT DOCUMENTS

| KR | 10-261752 B1 | 4/2000 | |
|---|---|---|---|
| KR | 10-2001-0076565 A | 8/2001 | |
| KR | 20060061365 | 6/2006 | |
| KR | 10-1160771 | 6/2012 | |
| WO | WO 2014028634 A1 * | 2/2014 | ............. G21C 15/18 |

* cited by examiner

FIG 1.

Prior Art

WATER-AIR COMBINED PASSIVE FEED WATER COOLING APPARATUS AND SYSTEM

CROSS-REFERENCES TO RELATED APPLICATION

This patent application claims the benefit of priority under 35 U.S.C. § 119 from Korean Patent Application No. 10-2014-0023605 filed Feb. 27, 2014, the contents of which are incorporated herein by reference.

BACKGROUND OF THE INVENTION

1. Field of the Invention

The present disclosure relates to a water-air combined passive feed water cooling apparatus and system, and more particularly, to a water-air combined passive feed water cooling apparatus and system for effective cooling, condensing steam of cooling water generated by water cooling through air cooling and refilling the same as cooling water for a heat exchanger of a passive feed water cooling system.

2. Description of the Related Art

After an accident of a light water reactor including a security system configured as an active pump driven using electricity, when a feed water system does not operate, residual heat of a nuclear reactor is removed by driving an auxiliary feed water pump through a steam generator. On the other hand, there is a passive auxiliary feed water cooling system does not need electricity and removes residual heat of a nuclear reactor through a steam generator as a passive apparatus for natural circulation force.

Figure 1:
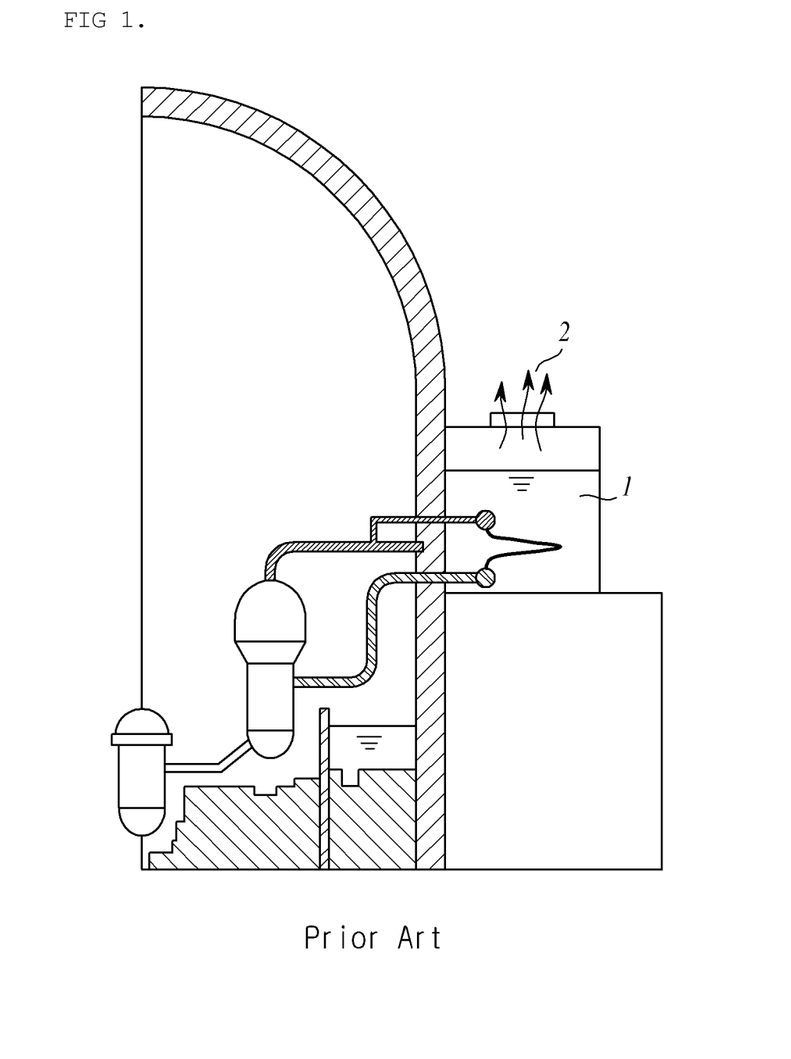
FIG. 1 is a cross-sectional view of a general passive auxiliary feed water cooling system.

Referring to FIG. 1, since a design of a general passive auxiliary feed water system has a structure, in which when cooling water in a heat exchange cooling tank (PCCT: Passive Containment Cooling Tank) 1 located outside a reactor containment building boils, generated steam 2 is discharged into the air, the cooling ability of the general passive auxiliary feed water system is lost after all the cooling water of the heat exchange cooling tank (PCCT) 1 is evaporated. A cooling time of the passive auxiliary feed water system is designed generally to have 8 hour cooling ability as a reference. However, after Fukushima nuclear accidents, it is necessary for a nuclear reactor cooling system to have about 72 hour cooling ability.

To greatly extend the cooling time of a general passive feed water system from 8 hours to 72 hours or more, it is necessary to design a volume of a cooling tank of the passive feed water system to be greater several times. Accordingly, it is necessary not only to increase a volume of a water tank but also to strongly design supporting structures for the water tank to be resistant to earthquakes.

Also, an auxiliary feed water system using a pump has a possibility of a failure caused by an error of an operator, power failure, the malfunction of the pump.

To overcome such limitations, there is provided a passive auxiliary feed water cooling system capable of increasing security and economic feasibility by passively cooling down residual heat of a nuclear reactor through condensing steam generated from a secondary side of a steam generator when a nuclear reactor accident occurs. For example, there are Korean Patent Registration No. 10-0261752 and Korean Patent Publication No. 2001-0076565, including a vertical isolation condenser of a boiling water reactor, an isolation condenser tank including cooling water and heat-exchangeable with the isolation condenser, a pipe connecting a steam generator to the isolation condenser, and a makeup water tank.

However, general passive auxiliary feed water cooling systems for a light-water nuclear reactor have limitations such as refilling a cooling water tank of a passive auxiliary feed water system with cooling water after all cooling water of the heat exchange cooling tank (PCCT) 1 is evaporated or designing a cooling water tank to be greater several times.

Due to the limitations, it is necessary to provide a water-air combined feed water cooling system extending a cooling water exhaustion time by refilling a cooling tank of a passive feed water system with steam evaporated from the cooling tank and discharged into the air.

CITED INVENTIONS

Cited invention 1: Korean Patent Registration No. 10-0261752

Cited invention 2: Korean Patent Publication No. 2001-0076565

SUMMARY OF THE INVENTION

Embodiments of the present invention are directed to provide a water-air combined passive feed water cooling apparatus and system extending a cooling water exhaustion time by cooling down steam of cooling water evaporated from a cooling tank of a general passive feed water system into the air through an air cooling heat exchanger and recirculating the steam to the cooling tank.

According to an aspect of the present invention, there is provided a water-air combined passive feed water cooling apparatus including a water cooling heat exchanger connected to the inside of a containment building to cool down heat of a steam generator using a water cooling method, a cooling tank including the water cooling heat exchanger therein and storing cooling water condensing main steam generated by the steam generator, an evaporative steam pipe connected to the cooling tank, the evaporative steam pipe, into which steam of the cooling water generated by the water cooling heat exchanger in the cooling tank flows, an air cooling heat exchanger connected to the evaporative steam pipe and cooling down and liquefying the steam flowing into the evaporative steam pipe, and a condensed water collecting pipe for refilling the cooling tank with the steam liquefied by the air cooling heat exchanger.

The cooling tank may be formed of a pressure vessel.

The air cooling heat exchanger may include a radiator receiving steam of cooling water generated in the cooling tank through the evaporative steam pipe and emitting heat outwards.

The air cooling heat exchanger may be formed of a horizontal heat exchange condensing tube.

The apparatus of claim 4, wherein the horizontal heat exchange condensing tube is formed of a heat exchange tube including a cooling fin to increase heat emission efficiency.

The air cooling heat exchanger may be formed with a pipe for emitting a non-condensed gas.

The pipe for emitting the non-condensed gas may be exposed outwards at a top pipe of the radiator.

The radiator may be formed of at least two vertical pipes and at least two horizontal pipes intersecting with one another.

The horizontal pipes may have an incline to allow the condensed steam to flow toward the condensed water collecting pipe.

The condensed cooling water may be allowed to flow into the vertical pipes extended from the condensed water collecting pipe due to the incline.

The condensed water collecting pipe, to prevent a backflow toward the condensed water collecting pipe, may have an outlet located below an uppermost location of the water cooling heat exchanger.

According to another aspect of the present invention, there is provided a passive feed water cooling system including a water cooling heat exchanger located outside a containment building and connected to the inside of the containment building to cool down heat of a steam generator using a water cooling method, a cooling tank located outside the containment building, including the water cooling heat exchanger therein and storing cooling water condensing main steam generated by the steam generator, an evaporative steam pipe connected to the cooling tank, the evaporative steam pipe, into which steam of the cooling water generated by the water cooling heat exchanger in the cooling tank flows, an air cooling heat exchanger connected to the evaporative steam pipe and cooling down and liquefying the steam flowing into the evaporative steam pipe, a condensed water collecting pipe for refilling the cooling tank with the steam liquefied by the air cooling heat exchanger, an air induction duct formed outside the air cooling heat exchanger and formed of a hollow pipe including one air inlet and one air outlet to induce an air flow outside the air cooling heat exchanger, and a cooling air blower installed inside the air induction duct and forcibly generating an air flow, in which the passive feed water cooling systems are formed on four sides of the containment building, respectively.

The cooling water blower may be located on a top end inside the air induction duct.

The cooling air blower may be located on a bottom end inside the air induction duct.

The cooling air blower may be located in a middle inside the air induction duct.

The cooling air blower may be selectively formed in at least two selected from the top end, the bottom end, and the middle inside the air induction duct.

The air induction duct may be extended in a direction horizontal to a ground surface.

The air induction duct may include an electric-powered fan generating an air flow and a driving unit for driving the electric-powered fan.

The electric-powered fan may include at least three rotors. Also, to naturally circulate the air when the driving unit does not operate, the electric-powered fan may have a total projected cross-sectional area of the rotors less than about ⅓ of a cross-sectional area of the air induction duct.

The driving unit may be formed of a motor.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, exemplary embodiments of the present invention will be described in detail with reference to the attached drawings. Herein, configurations and operations illustrated in the drawings and described with reference thereto are just at least one embodiment. However, the technical scope and essential configurations and operations of the present invention are not limited thereto.

Generic terms widely used for functions in present are selected as the terms used herein. However, they may vary with the intension of those skilled in the art, practice, or the appearance of novel technology. Also, particularly, there are present terms selected arbitrarily by applicant(s). In this case, meanings thereof will be described in detail. Accordingly, the terms used herein are not determined simple designations but will be defined based on meanings thereof and the contents throughout the present specification.

The present invention provides a passive feed water cooling system including a water cooling heat exchanger located outside a containment building to be connected to the inside of the containment building and cooling down heat of a steam generator using a water cooling method, a cooling tank located outside the containment building, including the water cooling heat exchanger therein, and storing cooling water for condensing main steam generated by the steam generator, an evaporative steam pipe connected to the cooling tank to allow steam of cooling water generated by the water cooling heat exchanger to flow therein, an air cooling heat exchanger for cooling down the steam flowing into the evaporative steam pipe to liquefy the steam, a condensed water collecting pipe for refilling the cooling tank with the steam liquefied by the air cooling heat exchanger, an air induction duct formed outside the air cooling heat exchanger, which is a hollow pipe including one air inlet and one air outlet, to induce an air flow outside the air cooling heat exchanger, and a cooling air blower installed in the air induction duct to forcibly generate an air flow. The passive feed water cooling system provides water-air combined passive feed water cooling systems formed on four sides of the containment building, respectively.

Hereinafter, it will be described in detail with reference to the attached drawings.

Figure 2:
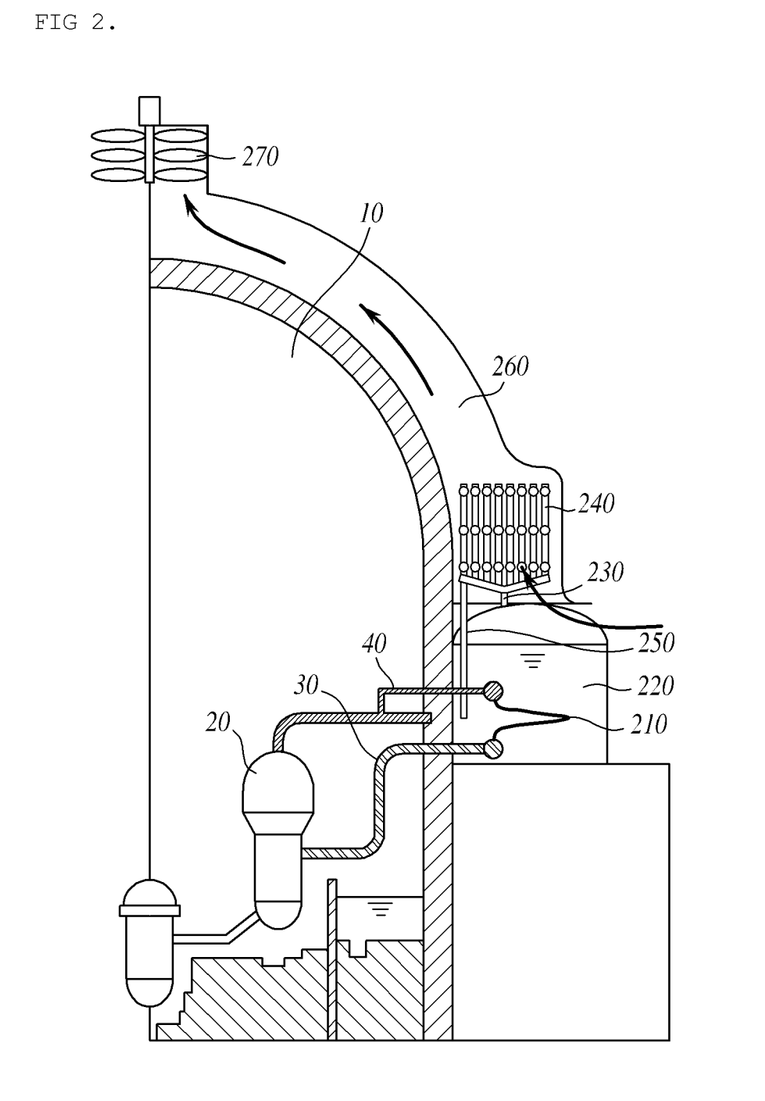
FIG. 2 is a vertical cross-sectional view of a water-air combined passive feed water cooling apparatus according to an embodiment of the present invention.

FIG. 2 is a vertical cross-sectional view of a water-air combined passive feed water cooling apparatus according to an embodiment of the present invention.

Referring to FIG. 2, the water-air combined passive feed water cooling apparatus may include a water cooling heat exchanger 210, a cooling tank 220, an evaporative steam pipe 230, an air cooling heat exchanger 240, a condensed water collecting pipe 250, an air induction duct 260, and a cooling air blower 270.

A containment building 10 protects a nuclear reactor causing a high indoor temperature and prevents radioactive materials from being discharged into the air. A steam generator 20 is formed inside the containment building 10. Main steam is condensed by the water cooling heat exchanger 210 in the cooling tank 220 and flows into the steam generator 20 through a feed water pipe 30. The evaporated main steam is discharged through a steam pipe 40. The main steam may be a coolant circulating through the steam generator 20, the steam pipe 40, the water cooling heat exchanger 210, and the feed water pipe 30.

The cooling water heat exchanger 210 is connected between the feed water pipe 30 and the steam pipe 40 to condense the main steam flowing through the steam pipe 40. The main steam is condensed by the cooling water in the cooling tank 220. The main steam condensed by the water cooling heat exchanger 210 may flow again into the steam generator through the feed water pipe 30. A method of condensing the steam using the cooling water is a water cooling method, which rapidly cools down but is impossible to cool down when cooling water in a cooling tank is exhausted.

The cooling tank 220 may be a container storing cooling water. The cooling tank 220 cools down heat generated by the water cooling heat exchanger 210 using cooling water stored therein. Due thereto, the cooling water may be evaporated. The cooling tank 220 may be formed with a cover on a top thereof to prevent steam generated from the cooling tank 220 from being discharged outwards. The cooling tank 220 may be a pressure vessel available at more than constant pressure. Due to a structure described above, the steam generated from the cooling tank 220 is not discharged outwards and may mostly flow into the evaporative steam pipe 230.

The evaporative steam pipe 230 may be inserted with the steam generated from the cooling tank 220.

The evaporative steam pipe 230 is installed on a top of the cooling tank 220 and is connected to the air cooling heat exchanger 240. Cooling steam generated from the cooling tank 220 may flow into the air cooling heat exchanger 240 due to the pressure of the cooling steam.

The air cooling heat exchanger 240 may be a radiator for emitting outwards heat of the cooling steam flowing from the evaporative steam pipe 230. The radiator is an apparatus for emitting outwards heat. To efficiently perform emission, the radiator may have a structure formed with a large surface area. Steam may flow from the evaporative steam pipe 230 to the air cooling heat exchanger 240. However, when a large amount of steam flows from the evaporative steam pipe 230, it is necessary to design the pressure of the air cooling heat exchanger 240 is necessary to be high. In this case, there are limitations in stability and manufacturing costs.

Figure 3:
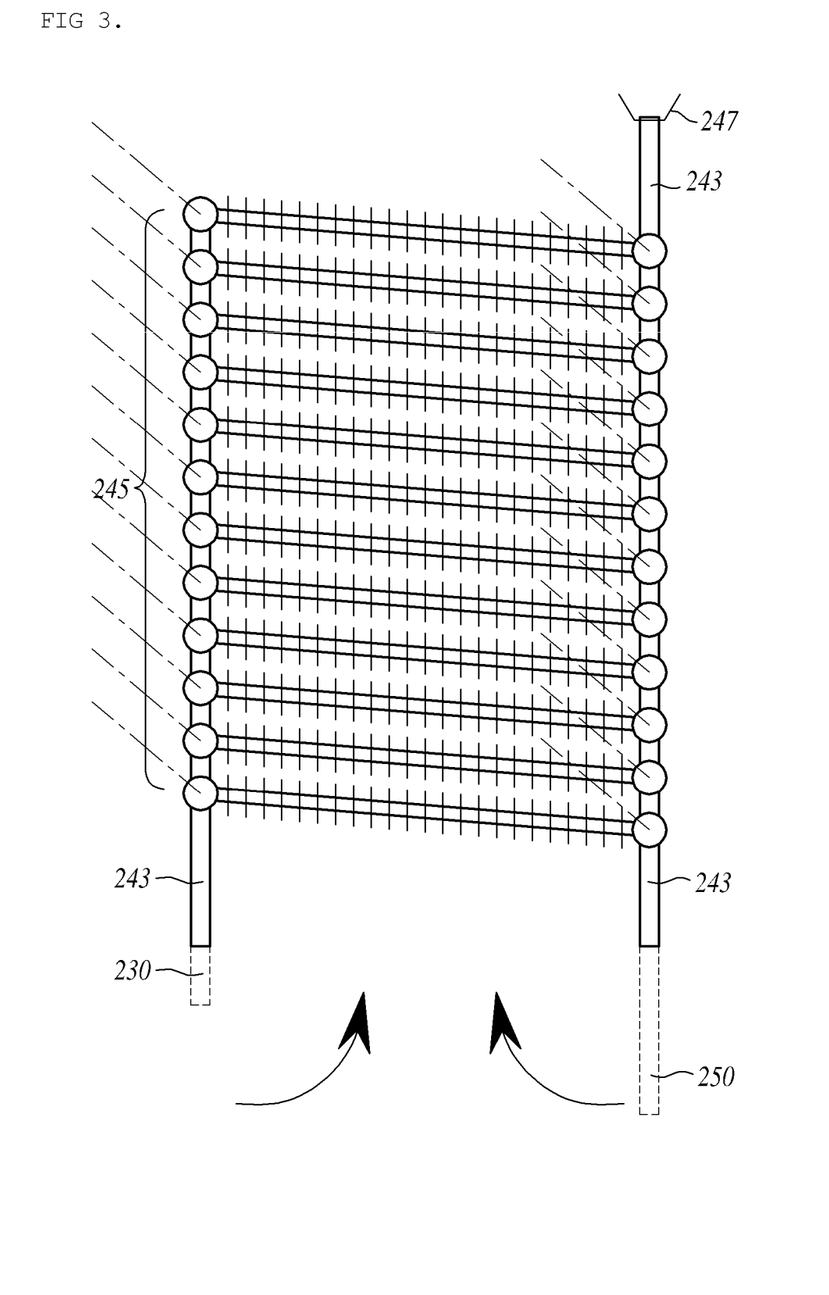
FIG. 3 is an enlarged view of an air cooling heat exchanger of the water-air combined passive feed water cooling apparatus of FIG. 2.

Accordingly, to prevent a significant increase in pressure in the air cooling heat exchanger 240 caused by the steam flowing from the evaporative steam pipe 230, a part of an upper pipe of the air cooling heat exchanger 240 (hereinafter, referred to as an opening portion 247) may be exposed outwards to the air. Due to a configuration of the air cooling heat exchanger 240 as described above, steam with excessive pressure and some of a non-condensed gas not condensed may be discharged outwards through the opening portion 247. An orifice is formed on the opening portion 247 of the air cooling heat exchanger 240 to form an air-exposed area to be controllable. Hereinafter, it will be described in detail with reference to FIG. 3. The air cooling heat exchanger 240 is formed with a plurality of vertical pipes 243 and a plurality of horizontal pipes 245 intersecting one another. The plurality of horizontal pipes 245 may have an incline to allow steam of cooling water liquefied in the air cooling heat exchanger 240, which is condensed to water, to flow through the horizontal pipes 245 to refill the cooling tank 220 through the condensed water collecting pipe 250. The incline may be at an angle of about −3 degrees to be appropriate for allowing the steam of cooling water liquefied in the air cooling heat exchanger 240 to flow through the horizontal pipes 245 and to flow into the condensed water collecting pipe 250. The plurality of horizontal pipes 245 may include a plurality of fins to enlarge a contact area exposed outwards. One of the vertical pipes 243 may be extended to be connected to the condensed water collecting pipe 250. The condensed water may flow into the extended one of the vertical pipes 243, connected to the condensed water collecting pipe 250, due to the incline of the plurality of horizontal pipes 245.

The condensed water collecting pipe 250 is extended from the air cooling heat exchanger 240 to the cooling tank 220. The condensed water collecting pipe 250 is configured not to allow steam generated from the cooling tank 220 to flow into the air cooling heat exchanger 240 through the condensed water collecting pipe 250 when the steam generated from the cooling tank 220 flows into the air cooling heat exchanger 240 through the evaporative steam pipe 230. To prevent a backflow, an outlet of the condensed water collecting pipe 250 may be located below a lowest free water surface of the cooling water in the cooling tank 220. Herein, a head of cooling water located in the condensed water collecting pipe 250 is formed to be greater than the resistance of the evaporative steam pipe 230 that is a connection point between the cooling tank 220 and the air cooling heat exchanger 240, thereby preventing the steam of cooling water from flowing back to the air cooling heat exchanger 240 through the condensed water collecting pipe 250. In the configuration described above, the outlet of the condensed water collecting pipe 250 may be located below the lowest free water surface of the cooling water in the cooling tank 220. When the outlet of the condensed water collecting pipe 250 is located above the lowest free water surface of the cooling water in the cooling tank 220, the steam of cooling water generated by the water cooling heat exchanger 210 may flow backward to the air cooling heat exchanger 240 through the condensed water collecting pipe 250.

The air induction duct 260 may increase the efficiency of natural circulating air cooling when cooling down the air cooling heat exchanger 240. The air cooling heat exchanger 240 is located in the air induction duct 260. The air induction duct 260 may have a hollow pipe shape formed with an air inlet and an air outlet on top and bottom thereof, respectively, and may be in accordance with an outer wall of the containment building 10. Due to the configuration of a chimney described above and heat of the air cooling heat exchanger 240, a chimney effect may occur in the air induction duct 260, which forms an air flow from a bottom to a top of the air induction duct 260. Due to an ascending current generated by the chimney effect, the natural circulation cooling of the air cooling heat exchanger 240 may be rapidly performed.

Figure 6A:
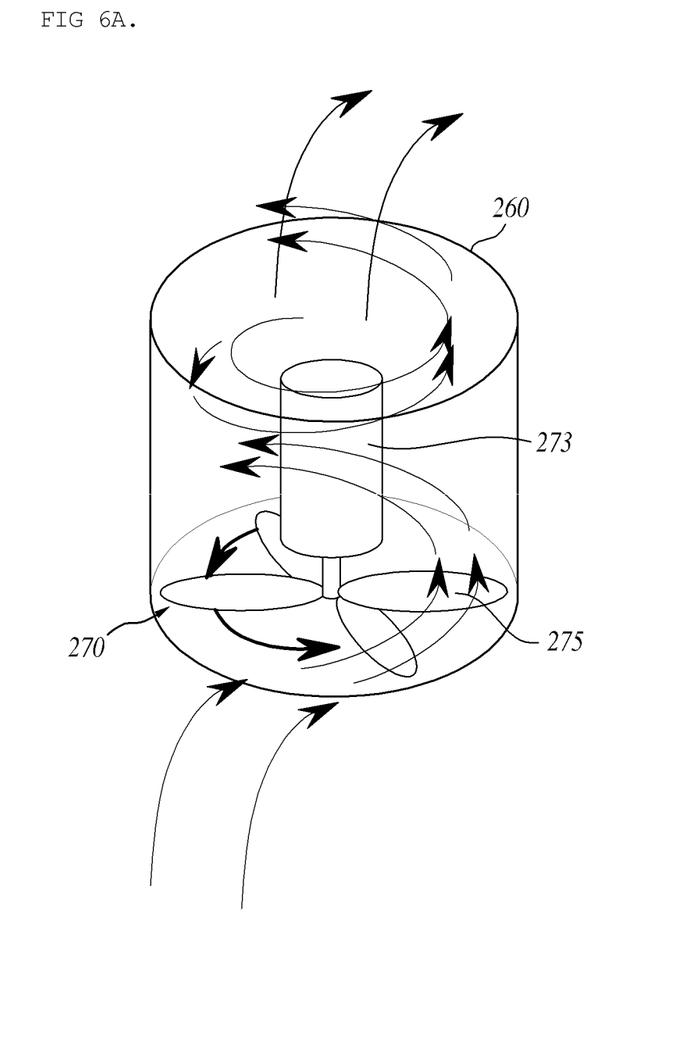
FIG. 6A is a view of a rotating electric-powered fan of the water-air combined passive feed water cooling system of FIG. 4.
Figure 6B:
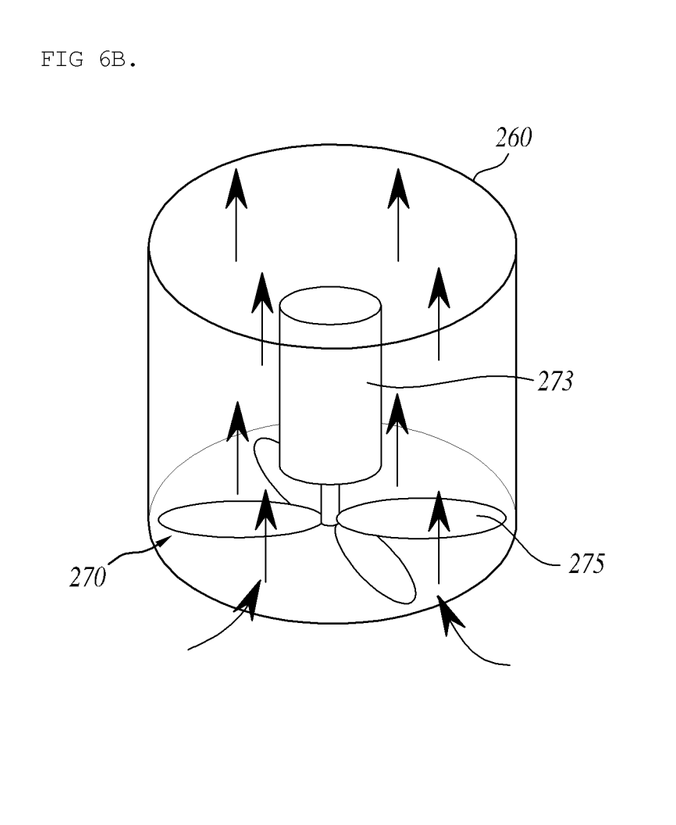
FIG. 6B is a view of the stopped electric-powered fan of FIG. 6A.

The cooling air blower 270 includes a driving unit 273 and an electric-powered fan 275. It is possible to forcibly generate the ascending current in the air induction duct 260 by the electric-powered fan 275 installed in a path of the air induction duct 260. This allows a larger amount of air of a naturally generated ascending current to flow, thereby increasing the cooling efficiency of the air cooling heat exchanger 240. The electric-powered fan 275 may be driven by the driving unit 273. The driving unit 273 may be a motor. Hereinafter, the electric-powered fan 275 will be described in detail with reference to FIG. 6.

Figure 4:
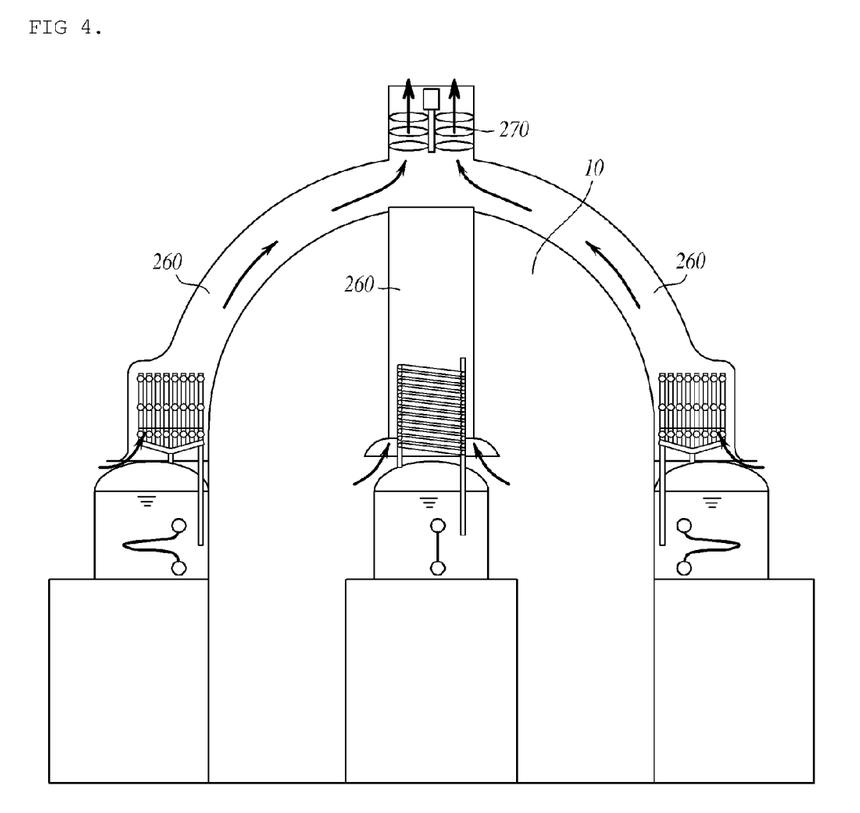
FIG. 4 is a vertical cross-sectional view of a water-air combined passive feed water cooling system according to an embodiment of the present invention.

FIG. 4 is a vertical cross-sectional view of a water-air combined passive feed water cooling system according to an embodiment of the present invention.

Referring to FIG. 4, the air induction duct 260 of the water-air combined passive feed water cooling system includes one air inlet and one air outlet. The air inlet is formed on a bottom of the air induction duct 260 as a hollow pipe formed vertically to a ground surface. The outlet is formed on a top of the air induction duct 260. The cooling air blower 270 may be formed at least one in the air induction duct 260. Herein, the air inlet may be formed on the bottom of the air induction duct 260 in a direction horizontal to the ground surface. The cooling air blower 270 may be formed in the air inlet in the horizontal direction. The cooling air blower 270 may be installed in any one of a top end, a bottom end, and a middle of the air induction duct 260. Preferably, the cooling air blower 270 may be installed on the bottom end of the air induction duct 260 but is not limited thereto. When the cooling air blower 270 is installed on the bottom end of the air induction duct 260, it becomes easy to replace, maintain, and repair the cooling air blower 270.

Figure 5:
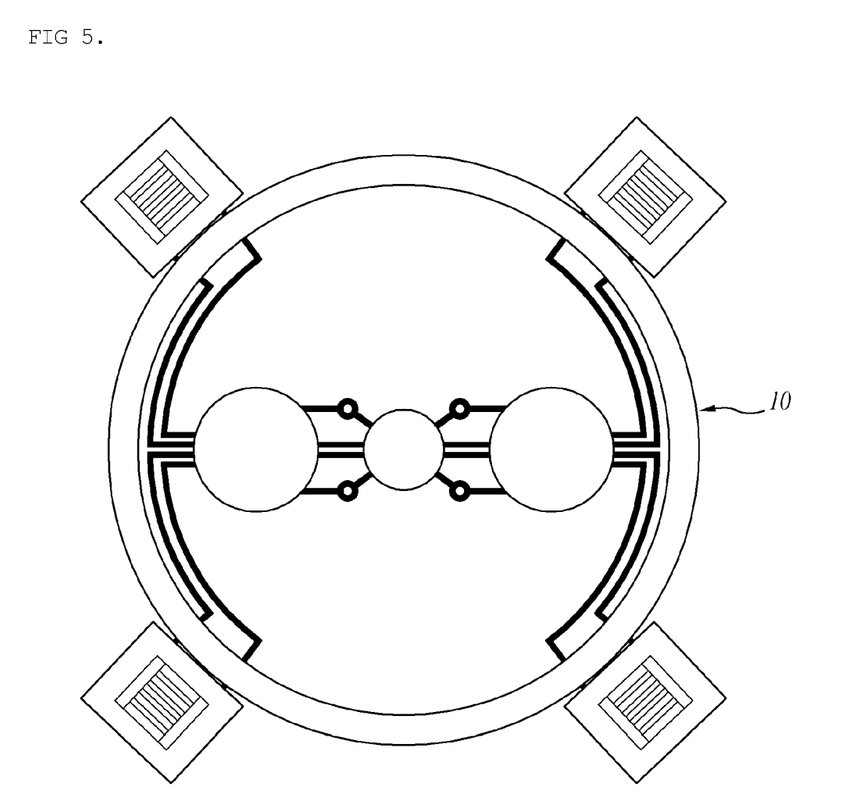
FIG. 5 is a horizontal cross-sectional view of the water-air combined passive feed water cooling system of FIG. 4.

FIG. 5 is a horizontal cross-sectional view of the water-air combined passive feed water cooling system of FIG. 4.

Referring to FIG. 5, the water-air combined passive feed water cooling system may be formed four on the outside the containment building 10. A plurality of water-air combined passive feed water cooling systems may increase the efficiency of cooling through a plurality of coolers. When some of the coolers do not operate, it is possible to maintain cooling. To have ability of about 100% cooling down residual heat when one of the four coolers breaks down, each of the four water-air combined passive feed water cooling systems may have a heat removal capacity of cooling down more than about 33% of residual heat emitted from a nuclear reactor in the containment building 10 but is not limited thereto.

FIGS. 6A and 6B illustrate operations of the cooling air blower 270 of the water-air combined passive feed water cooling system.

Referring to FIG. 6A, the cooling air blower 270 may include the electric-powered fan 275 and the driving unit 273. The cooling air blower 270 is formed in the path of the air induction duct 260 but is not limited. The electric-powered fan 275 is driven by the driving unit 273. The driving unit 273 generates rotational motion and may be a motor. Due to rotations of the electric-powered fan 275, an ascending current generated in the air induction duct 260 may increase. However, when power is not supplied due to an accident occurring in the nuclear reactor, the electric-powered fan 275 does not rotate. Herein, when the electric-powered fan 275 has a large area, the occurrence of the ascending current may be limited. To overcome a limitation described above, the area of the electric-powered fan 275 may be reduced.

Referring to FIG. 6B, the area of the electric-powered fan 275, to increase the pass of a natural ascending current k2 occurring in the air induction duct 260, may be less than about ⅓ of a cross-sectional area of the air induction duct 260 but is not limited thereto. Due to the configuration described above, the water-air combined passive feed water cooling system may allow forcible circulation by driving the electric-powered fan 275 when power is supplied, and may allow natural circulation when the power is not supplied and the electric-powered fan 275 is not driven.

Figure 7:
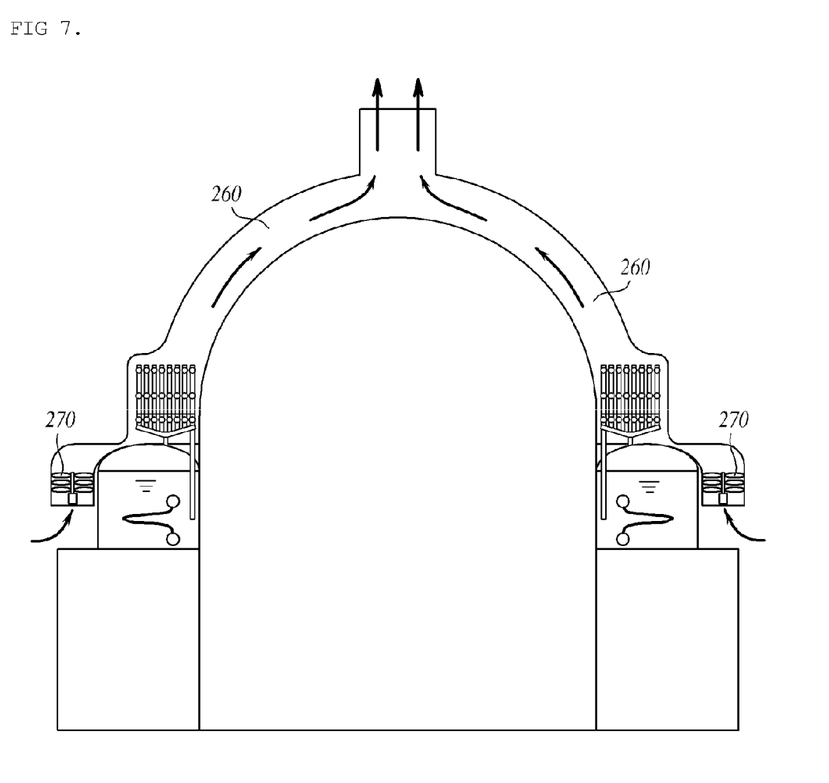
FIG. 7 is a vertical cross-sectional view illustrating a state, in which a cooling air blower of the water-air combined passive feed water cooling system of FIG. 4 is installed on a bottom end of an air induction duct to be vertical to a ground surface.

FIG. 7 is a vertical cross-sectional view illustrating a state, in which the cooling air blower 270 of the water-air combined passive feed water cooling system is installed on the bottom of the air induction duct 260 to be vertical to the ground surface.

Referring to FIG. 7, the air cooling heat exchanger 240 is located in the air induction duct 260. The air induction duct 260 may have a hollow pipe shape formed with an air inlet and an air outlet on top and bottom thereof, respectively, and may be in accordance with an outer wall of the containment building 10. The air induction duct 260 may be extended to allow the air inlet to be in accordance with a shape of the cooling tank 220. The air inlet may be installed to be vertical to the ground surface. Also, the cooling air blower 270 may be installed in the air inlet and may be installed to be vertical to the ground surface according to a shape of the air inlet.

Figure 8:
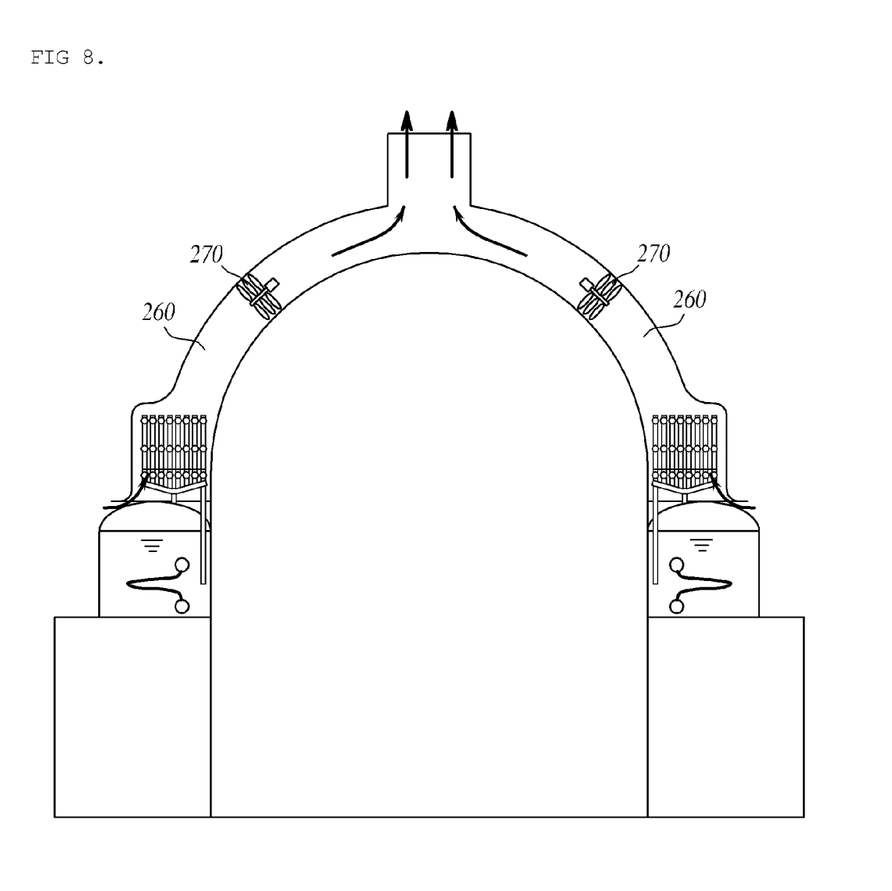
FIG. 8 is a vertical cross-sectional view illustrating a state, in which the cooling air blower of FIG. 7 is installed on the bottom of the air induction duct to be horizontal to the ground surface.

FIG. 8 is a vertical cross-sectional view illustrating a state, in which the cooling air blower 270 is installed on the bottom of the air induction duct 260 to be horizontal to the ground surface.

Referring to FIG. 8, the air cooling heat exchanger 240 is located in the air induction duct 260. The air induction duct 260 may have a hollow pipe shape formed with an air inlet and an air outlet on top and bottom thereof, respectively, and may be in accordance with an outer wall of the containment building 10. The air induction duct 260 may be formed with the air inlet on a top of the cooling tank 220 to be extended in a direction horizontal to the ground surface. Also, the cooling air blower 270 may be installed in the air inlet and may be installed to be horizontal to the ground surface according to a shape of the air inlet.

Figure 9:
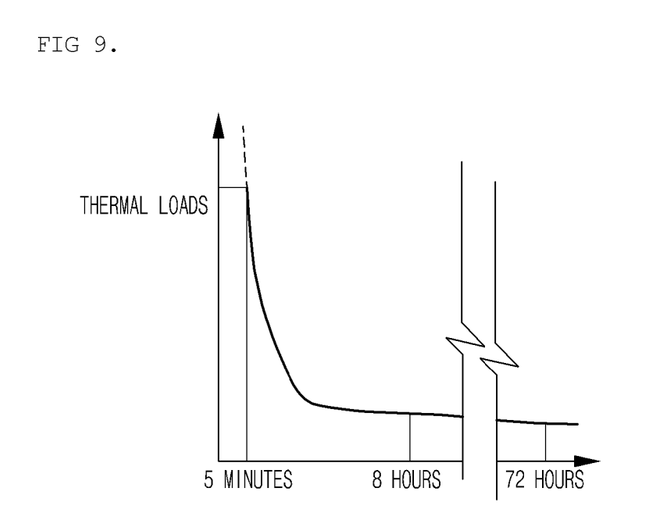
FIG. 9 is a graph illustrating a thermal load on a nuclear reactor according to an operation time of the water-air combined passive feed water cooling system of FIG. 4.

FIG. 9 is a graph illustrating a thermal load on the nuclear reactor according to an operation time of the water-air combined passive feed water cooling system.

Referring to FIG. 9, in an initial stage of an accident, heat at a high temperature is generated in the nuclear reactor and a lot of thermal loads are generated due to the heat of the high temperature. Initially, the thermal loads may be rapidly cooled down by a water cooling system having a great heat removal capacity. In advanced stages of the accident, in which heat emission diminishes, the thermal loads may be cooled down by an air cooling system having a smaller heat removal capacity than the water cooling system but capable of cooling down infinitely without a limitation of cooling water exhaustion, thereby preventing an excessive increase in volume of a heat exchanger and simultaneously providing desired cooling ability.

Figure 10:
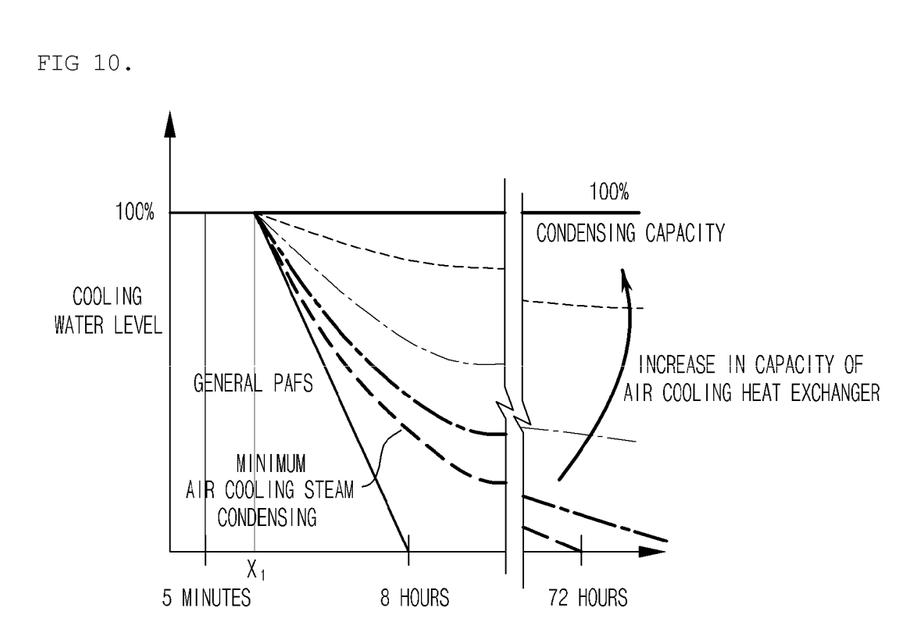
FIG. 10 is a graph illustrating an operation time and a cooling water level according to a heat removal capacity of the air cooling heat exchanger of the water-air combined passive feed water cooling system of FIG. 4.

FIG. 10 is a graph illustrating an operation time and a cooling water level according to a heat removal capacity of the air cooling heat exchanger of the water-air combined passive feed water cooling system.

Referring to FIG. 10, when heat of a steam generator is cooled down by a water cooling heat exchanger of a cooling tank in a general passive auxiliary feed water cooling system, when the evaporation of cooling water in the cooling tank starts at a time point of XI after an accident occurs and is performed for about 8 hours, all the cooling water is evaporated and the cooling tank lacks water. However, the water-air combined passive feed water cooling system according to the embodiment condenses evaporated cooling water through an air cooling process to refill a cooling tank, thereby extending an exhaustion time of the cooling water. According to an increase in a steam condensing capacity of an air cooling heat exchanger of the water-air combined passive feed water cooling system, the exhaustion time of the cooling water may be more increase, thereby having an at least more than about 72 hours of the exhaustion time. When condensing all 100% steam discharged outwards from a cooling tank into the air in a general passive auxiliary feed water cooling system to recirculate through the cooling tank, it means a water level of cooling water is absolutely not reduced. To have a cooling time capacity of more than about 72 hours, the water-air combined passive feed water cooling system may be configured while an air cooling heat exchanger is having an appropriate level of a steam condensing capacity.

As described above, according to the embodiment, steam of cooling discharged from a cooling tank of a general passive feed water system into the air is condensed by an air cooling heat exchanger to refill the cooling tank, thereby greatly increasing a cooling time of about 8 hours of the general passive feed water system to be more than about 72 hours. That is, without designing a volume of the cooling tank of the general passive feed water system to be greater several times, the cooling time may be greatly increased to be more than about 72 hours. Accordingly, it is possible to simultaneously overcome limitations such as an increase in a volume of a cooling tank of a passive feed water system and an increase in a thickness of a wall of an auxiliary building for a nuclear reactor according to the increase in the volume of the cooling tank.

In addition, according to the embodiment, since a high pressure boundary of the general passive feed water system is perfectly separated from a pressure boundary of an air cooling heat exchanger system, there is no increase in damageable portions of the high pressure boundary of the general feed water system according to an increase in a heat transfer area of the air cooling heat exchanger system.

Additionally, according to the embodiment, since it is unnecessary to include a controller such as a valve or a pump necessary to activate or deactivate an air cooling heat exchanger, there is no possibility of a failure of a corresponding device. When a forcible circulating air cooling fan operating in a state of supplying power indoors or outdoors of a nuclear power plant is deactivated because the power is not supplied, since having a structure for allowing cooling air to naturally circulate through an open area between rotors of the fan, an active/passive conversion controller is unnecessary.

Also, due to cooling systems installed on four sides of a containment building, water-air combined passive feed water cooling systems operate independently from one another. Although one of air outlets is closed and one of the cooling systems does not operate, other cooling systems may independently operate.

According to the above-described present invention, steam of cooling evaporated into the air is condensed by a natural circulating air cooling heat exchanger to refill a cooling tank, thereby extending a cooling water exhaustion time of the cooling tank, for example, to be more than about 72 hours. Accordingly, it is possible to increase a cooling time without an increase in a cooling water capacity of the cooling tank.

Since it is unnecessary to increase the cooling water capacity, improved effects may be provided using small facilities, thereby reducing costs and processes.

Regardless of supplying power indoors and outdoors of a nuclear power plant, air cooling is continuously performed by a natural circulating air cooling heat exchanger. Although a loss of power occurs and an electric-powered fan is deactivated, since it is possible to convert from forcible circulating air cooing through the electric-powered fan to natural circulation air cooling without operating an additional converter, cooling may be continuously performed when an accident of a nuclear reactor occurs.

An air induction duct for cooling down an air cooling heat exchanger includes respective air outlets. When one of the air outlets is closed, others may be independently driven from one another.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A water-air combined passive feed water cooling apparatus for a nuclear reactor containment building comprising:
    a water-cooled heat exchanger connected to the inside of the containment building, the water-cooled heat exchanger configured to cool down main steam of a steam generator;
    a cooling tank located outside the containment building, the cooling tank comprising the water-cooled heat exchanger therein and configured to store cooling water at a surface level and condense the main steam generated by the steam generator;
    an evaporative steam pipe connected to the cooling tank and having a bottom end positioned above the surface level of the cooling water, the evaporative steam pipe configured to receive steam of the cooling water generated by the water-cooled heat exchanger in the cooling tank;
    an air-cooled heat exchanger positioned above the cooling tank and connected to the evaporative steam pipe and configured to cool and condense the steam flowing into the evaporative steam pipe, the air-cooled heat exchanger having an opening portion at a top end of the air-cooled heat exchanger configured to emit non-condensable gas outside of the containment building;
    a condensed water collecting pipe configured to refill the cooling tank with the steam condensed by the air-cooled heat exchanger, wherein the condensed water collecting pipe has a bottom end positioned below the surface level of the cooling water; and
    an air induction duct extending vertically along an outside surface of the containment building above the cooling tank, the duct configured to induce an air flow around the air-cooled heat exchanger positioned within the duct.

2. The apparatus of claim 1, wherein the cooling tank is a pressure vessel.

3. The apparatus of claim 1, wherein the air-cooled heat exchanger comprises a radiator receiving steam of cooling water generated in the cooling tank through the evaporative steam pipe and emitting heat outwards.

4. The apparatus of claim 3, wherein the radiator is formed of at least two vertical pipes and at least two horizontal pipes intersecting with one another.

5. The apparatus of claim 3, wherein the radiator comprises at least one pipe having an incline to allow condensed steam to flow toward the condensed water collecting pipe.

6. The apparatus of claim 5, wherein the condensed steam is allowed to flow into the vertical pipes extended from the condensed water collecting pipe due to the incline.

7. The apparatus of claim 6, wherein the condensed water collecting pipe, to prevent a backflow toward the condensed water collecting pipe, has an outlet located below an uppermost location of the water-cooled heat exchanger.

8. The apparatus of claim 1, wherein the air-cooled heat exchanger comprises at least a horizontal heat exchange condensing tube.

9. The apparatus of claim 8, wherein the horizontal heat exchange condensing tube is formed of a heat exchange tube comprising a cooling fin to increase heat emission efficiency.

10. The apparatus of claim 1, wherein the opening portion is a pipe.

11. The apparatus of claim 3, wherein the opening portion is a pipe connected to a top pipe of the radiator.

12. A water-air combined passive feed water cooling system for a nuclear reactor containment building formed of a plurality of passive feed water cooling systems each comprising:
 a water-cooled heat exchanger located outside the containment building and connected to the inside of the containment building and configured to cool down main steam of a steam generator;
 a cooling tank located outside the containment building, the cooling tank comprising the water-cooled heat exchanger therein and configured to store cooling water at a surface level and condense the main steam generated by the steam generator;
 an evaporative steam pipe connected to the cooling tank and having a bottom end positioned above the surface level of the cooling water, the evaporative steam pipe configured to receive steam of the cooling water generated by the water-cooled heat exchanger in the cooling tank;
 an air-cooled heat exchanger positioned above the cooling tank connected to the evaporative steam pipe and configured to cool and condense the steam flowing into the evaporative steam pipe, the air-cooled heat exchanger having an opening portion at a top end of the air-cooled heat exchanger configured to emit non-condensable gas outside of the containment building;
 a condensed water collecting pipe configured to refill the cooling tank with the steam condensed by the air-cooled heat exchanger, wherein the condensed water collecting pipe has a bottom end positioned below the surface level of the cooling water;
 an air induction duct formed of a hollow pipe comprising one air inlet and one air outlet, the duct extending vertically along an outside surface of the containment building above the cooling tank and configured to induce an air flow around the air-cooled heat exchanger positioned within the duct; and
 a cooling air blower installed inside the air induction duct and configured to forcibly generate the air flow,
 wherein each quadrant of the containment building is provided with one of the plurality of the passive feed water cooling systems.

13. The system of claim 12, wherein the cooling air blower is located on a top end inside the air induction duct.

14. The system of claim 12, wherein the cooling air blower is located on a bottom end inside the air induction duct.

15. The system of claim 12, wherein the cooling air blower is located in a middle inside the air induction duct.

16. The system of claim 12, wherein the cooling air blower is selectively formed in at least two selected from the top end, the bottom end, and the middle inside the air induction duct.

17. The system of claim 12, wherein the air induction duct is extended in a direction horizontal to a ground surface.

18. The system of claim 12, wherein the cooling air blower comprises:
 an electric-powered fan generating an air flow; and
 a driving unit for driving the electric-powered fan.

19. The system of claim 18, wherein the electric-powered fan comprises at least three rotors, and
 wherein to naturally circulate the air when the driving unit does not operate, the electric-powered fan has a total projected cross-sectional area of the rotors less than about ⅓ of a cross-sectional area of the air induction duct.

20. The system of claim 18, wherein the driving unit is formed of a motor.

* * * * *